United States Patent [19]
Darmory et al.

[11] 3,944,525
[45] Mar. 16, 1976

[54] CROSSLINKED RESINS PREPARED FROM AN N,N'-BIS-IMIDE AND A SCHIFF BASE

[75] Inventors: Franklin P. Darmory; Marianne DiBenedetto, both of Ardsley, N.Y.

[73] Assignee: Ciba-Geigy Corporation, Ardsley, N.Y.

[22] Filed: Oct. 3, 1973

[21] Appl. No.: 403,236

[52] U.S. Cl....... 260/78 UA; 260/37 N; 260/47 CZ; 260/47 UA; 260/63 R; 260/64; 260/65; 260/72 R; 260/72.5; 260/73 R
[51] Int. Cl.$^2$.......................................... C08G 69/29
[58] Field of Search...... 260/78 UA, 47 CZ, 47 UA, 260/72 R, 72.5, 73 R

[56] References Cited
UNITED STATES PATENTS

| | | | |
|---|---|---|---|
| 3,658,764 | 4/1972 | Bargain et al.................. | 260/78 UA |
| 3,669,930 | 6/1972 | Asahara et al.................. | 260/78 UA |

OTHER PUBLICATIONS

Stille et al., Journal of Polymer Science, Part A, Vol. 2, pp. 1487–1491, (1964).

*Primary Examiner*—Harold D. Anderson
*Attorney, Agent, or Firm*—Vincent J. Cavalieri; Charles W. Vanecek

[57] ABSTRACT

Crosslinked resins are prepared by reacting an N,N'-bis-imide and a Schiff base at a temperature of from 100°C to 280°C. The crosslinked resins have good thermal stability and are useful for making adhesives, coatings, laminates and molded articles.

12 Claims, No Drawings

CROSSLINKED RESINS PREPARED FROM AN N,N'-BIS-IMIDE AND A SCHIFF BASE

This invention relates to new cross-lined resins possessing good thermal stability and a process for their preparation.

More particularly, this invention provides a heat stable curable composition comprising a. an unsaturated N,N'-bis-imide having the formula

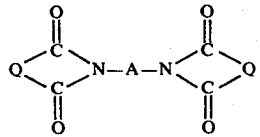 I wherein

A is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula

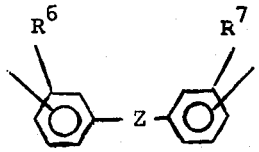

wherein Z is sulfur, carbonyl, —NH, N—(lower)alkyl, —O—, —N-phenyl, sulfonyl, an alkylene group of from 1 to 3 carbon atoms, $R^6$ and $R^7$ are independent and each is hydrogen, chloro, or bromo, (lower)alkyl of from 1 to 5 carbon atoms, (lower)alkoxy containing from 1 to 5 carbon atoms, or a group having the formula

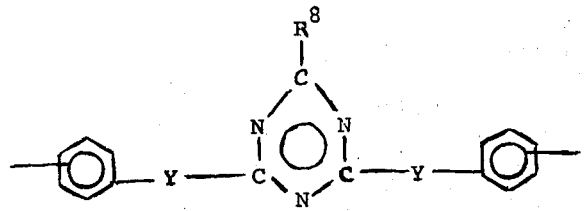

where Y is a covalent bond or —NH, and $R^8$ is phenyl, piperidino, hydrogen, diphenylamino or di(lower)alkyl amino;

Q is a divalent radical containing olefinic unsaturation having the formula

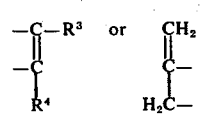

wherein $R^3$ is hydrogen, methyl, bromo or chloro;
$R^4$ is hydrogen, methyl, bromo or chloro;

b. From about 0.5 to 0.166 mole equivalents per mole equivalent of (a) of a Schiff base having the formula

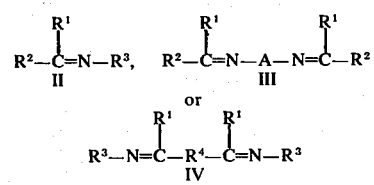

wherein $R^1$ and $R^2$ independently is hydrogen, an alkyl group containing from 1 to 12 carbon atoms, an aryl group containing from 6 to 12 carbon atoms, an alkaryl group containing from 7 to 15 carbon atoms, an aralkyl group containing from 7 to 15 carbon atoms, chlorophenyl, alkoxyphenyl said alkoxy containing from 1 to 5 carbon atoms or together with the carbon to which they are attached form a monocyclic ring containing 5 or 6 carbon atoms, with the proviso that only one of $R^1$ or $R^2$ may be hydrogen at the same time;

$R^3$ is an alkyl group containing from 1 to 12 carbon atoms, an aryl group containing from 6 to 12 carbon atoms, an alkaryl group containing from 7 to 15 carbon atoms, an aralkyl group containing from 7 to 15 carbon atoms, chlorophenyl, alkoxyphenyl said alkoxy containing from 1 to 5 carbon atoms, cyclohexyl or cyclopentyl;

$R^4$ is an alkylene group containing from 2 to 12 carbon atoms, phenylene, tolylene, biphenylene, naphthalene, or an arylene group having the formula

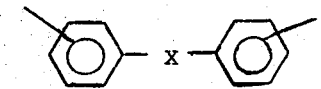

wherein X is —S—, —O—, NH, N-phenyl, sulfonyl, or an alkylene group containing from 1 to 3 carbon atoms; and A is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula

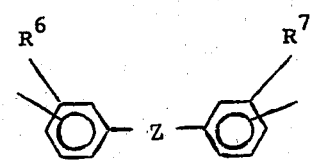

wherein Z is sulfur, carbonyl, —NH, N—(lower)alkyl, —O—, —N-phenyl, sulfonyl an alkylene group of from 1 to 3 carbon atoms, $R^6$ and $R^7$ are independent and each is hydrogen, chloro, or bromo, (lower)alkyl of from 1 to 5 carbon atoms, (lower)alkoxy containing from 1 to 5 carbon atoms, or a group having the formula

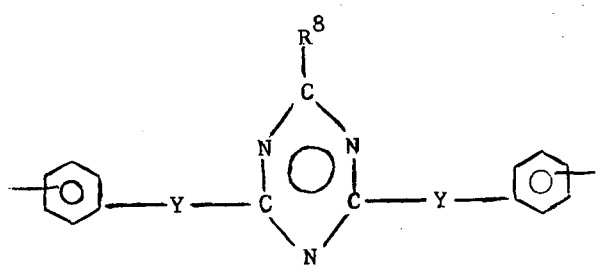

where Y is a covalent bond or —NH, and R⁸ is phenyl, piperidino, hydrogen, diphenylamino or di(lower)alkyl amino;
and to the cross-linked resins obtained therefrom.

The cross-linked resins of this invention are obtained by reacting the unsaturated N,N'-bis-imide with the polySchiff base, in a ratio of equivalents of bis-imide to equivalents of Schiff base of between 2:1 and 6:1, at a temperature of from 100° to 350° and preferably from 100°C to 280°C.

Conventional plastic processing techniques such as autoclave and vacuum bag laminating, compression and injection molding can be used to fabricate useful objects from this composition which possess good mechanical and thermal oxidative properties as well as low void content. The chain extended and cross-linked resins of this invention may be used as adhesives, laminating resins, coatings for decorative and electrical purposes and molding compounds.

The composition of this invention possesses good melt viscosity. There is a good separation between melting point and cure temperature, thus eliminating the need for solvents since the material can be handled as a fluid melt. The desirable characteristic of moldability is also present.

Both melting point and cure temperatures are lower than those characteristic of conventional polyimides.

The radical Q is derived from an ethylenically unsaturated anhydride of the formula

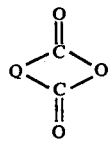

wherein Q is as defined hereinbefore, which may be, for example, maleic anhydride, citraconic anhydride, chloro maleic anhydride, dichloro maleic anhydride, bromo maleic anhydride.

The unsaturated bis-imides of formula I are prepared by first forming the amide-acid by reacting amines of the formula

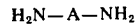

wherein A is as defined hereinbefore with said unsaturated anhydride in an inert solvent such as chloroform at about 25°C with subsequent cyclization and dehydration of the amide-acid to the imide by thermal or chemical means. Thus, these additives may be imidized by heating the amide-acids at a temperature sufficient to effect immidization while removing the water formed by azeotropic distillation, e.g., by refluxing in toluene at 110°C, or adding acetic anhydride/pyridine mixture to the amide-acid in chloroform. The preparation of these compounds are described in more detail in U.S. Pat. Nos. 2,444,536 and 3,010,290.

The Schiff bases of formulas II, III and IV comprise a well known class of compounds, and are obtained by reacting an aldehyde or ketone having the formulas

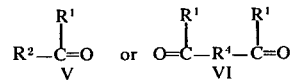

wherein $R^1$, $R^2$ and $R^4$ are as defined previously with a mono or diamine having the formulas:

or

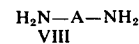

wherein $R^3$ and A are as defined previously, in equivalent amounts in an inert solvent. General methods for preparing the Schiff bases involve stirring the reactants in 95% ethanol and precipitation and drying of the product, or refluxing the reactants in either theoretical or toluene under a Dean-Stark trap until the thereoretical quantity of water distills over and separation and isolation of the Schiff base. Methods for preparing the Schiff bases of this invention are disclosed in Houben-Weyl, Methods of Organic Chemistry, Volume 11/2 (1958) page 73 ff, and in J.A.C.S., 84,3673 (1962).

More particularly, illustrative of the divalent organic radicals representative by $R^1$, $R^2$, and $R^3$ are an aryl group containing from 6 to 12 carbon atoms, such as phenyl, naphthyl, p-nitrophenyl, an alkaryl group containing from 7 to 15 carbon atoms such as tolyl, dimethylphenyl, an aralkyl group containing from 7 to 15 carbon atoms, such as benzyl, 2-phenylethyl; and an alkoxy aryl group such as methoxyphenyl.

Among the diprimary diamines which are suitable for preparing the unsaturated bis-imides of formula I and Schiff base of the present invention of formula III include the following:

4,4'-diamino-2,2'-sulfonediphenylmethane
ethylenediamine
m-phenylenediamine
p-phenylenediamine
4,4'-diaminodiphenylpropane
4,4'-diaminodiphenylmethane benzidine
4,4'-diaminodiphenyl sulfide
4,4'-diaminodiphenylsulfone
3,3'-diaminodiphenylsulfone 4,4'-diaminodiphenyl ether
4,4'-diaminobenzophenone
bis-(4-aminophenyl)-N-methylamine
1,5-diaminonaphthylene
3,3'-dimethyl-4,4'-diaminobiphenyl
3,3'-dimethoxybenzidine
2,4-toluenediamine
4,4'-methylene bis(o-chloroaniline)
4,4'-methylene bis(o-methoxyaniline)
4,4'-methylene bis(o-methylaniline)
m-xylylenediamine
p-xylylenediamine
bis-(4-aminocyclohexyl)-methane
hexamethylenediamine
heptamethylenediamine
octamethylenediamine
nonamethylenediamine
decamethylenediamine
3-methyl-heptamethylenediamine
4,4'-dimethylheptamethylenediamine
2,11-diaminododecane
2,2-dimethylpropylenediamine
3-methoxyhexamethylenediamine
4,4'-(p-aminophenyl)dissulfide
2,5-dimethylhexamethylenediamine
2,5-dimethylheptamethylenediamine
5-methylnonamethylenediamine
1,4-diaminocyclohexane
1,12-diaminooctadecane
2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
2-diphenylamino-4,6-bis(m-aminoanilino)-s-triazine
2-amino-4,6-bis(m-aminoanilino)-s-triazine
2-phenyl-4,6-bis(p-aminophenyl)-s-triazine
2-phenyl-4,6-bis(m-aminophenyl)-s-triazine
2-phenyl-4,6-bis(4'-aminoanilino)-s-triazine
2-phenyl-4,6-bis(3'-aminoanilino)-s-triazine
2-anilino-4,6-bis(4'-aminoanilino)-s-triazine
2-(N-methylanilino)-4,6-bis(3-aminoanilino)-s-triazine
2-dimethylamino-4,6-bis(3'-aminoanilino)-s-triazine
2-diphenylamino-4,6-bis(2'-aminoanilino)-s-triazine
2-diphenylamino-4,6-bis(4'-aminoanilino)-s-
2-phenyl-4,6-bis(2'-methyl-4'-aminoanilino)-s-triazine
2-diphenylamino-4,6-bis(3'-aminocyclohexylamino)-s-triazine
2H, 4,6-piperidino-4,6-bis(3'-aminoanilino)-s-triazine
2,4-bis(3'-aminoanilino)-s-triazine
2-diphenylamino-4,6-bis{4-(p-aminophenoxy)anilino}-s-triazine.

Among the monoamines of formula VII which are suitable for preparing the Schiff bases of formulas II and IV include methylamine, butylamine, isobutylamine, hexylamine, dodecylamine, cyclohexylamine, benzylamine, aniline, toluidine, α-naphthylamine, and β-naphthylamine.

Among the carbonyl compounds of formulas V and VI which are most suitable for preparing the Schiff bases of formulas III and IV include acetaldehyde, propionaldehyde, isobutyraldehyde, butyraldehyde, capronaldehyde, caprylaldehyde, caprinaldehyde, tetrahydrobenzaldehyde, hexahydrobenzaldehyde, furfural, benzaldehyde, 2-methyl-benzaldehyde, p-methoxybenzaldehyde, β-naphthaldehyde, acetone, methylethylketone, dibutylketone, diheptylketone, dodecylketone, dibenzylketone, acetophenone, butyrophenone, benzophenone, 2-methylacetophenone, 4-methoxypropiophenone, cyclopentanone, cyclohexanone, terephthalaldehyde, isophthalaldehyde, glyoxal, glutaraldehyde, acetonylacetone, 4,4'-diacetyldiphenylether.

The quantities of N,N'-bis-imide and of Schiff base are chosen in such a manner that the ratio $$\frac{\text{Number of equivalence of N,N'-bis-imide}}{\text{Number of equivalence Schiff base}}$$

is between 2:1 and 6:1.

When the polySchiff bases are prepared from an aldehyde, the optimum imide to Schiff base ratio is 2:1 equivalence, and when the polySchiff base is prepared from a ketone, the optimum bis-imide to Schiff base ratio is 3:1 equivalence. An equivalence is one imide linkage of the bis-imide and one amine linkage of the Schiff base.

The preparation of the new resins of the invention may be carried out in an inert polar diluent such as dimethylformamide, N-methylpyrrolidone, dimethylacetamide, or tetrahydrofuran. A solvent is advantageously used when the application of the polymer formed necessitates the use of a solution, because it makes it possible to obtain directly solutions whose solids content may be very high.

The preparation may also be carried out in bulk, by heating the reactants which have previously been initimately mixed. Depending upon the physical state of the reactants, conventional methods may be employed for mixing finely divided solids, or a solution or a dispersion of one of the reactants in the other, maintained in the liquid state, may be prepared. For many uses, it is advantageous, first to heat the mixture of the two reactants at a moderate temperature of the order of 100° to 250°C for a few minutes to a few hours. The prepolymer thus obtained may then be employed in solution in a solvent such as those referred to above or in suspension in an inert diluent, or it may be shaped by simple hot casting, or again it may be employed as powder. In a second phase, the hardening of the prepolymer may be directly effected by heating to temperatures of the order of 350°C, optionally under pressure.

The mixture may also be directly brought into the form of the desired article and the hardening may be effected by heating, optionally under pressure.

The cured resins are infusible and insoluble. They have excellent resistance to thermal stresses, have good dielectric properties and are endowed with excellent stability to chemical agents. They may be converted into multicellular materials or employed for bonding metals. They are also particularly useful for the preparation of laminates based on mineral fibres or moulded articles optionally in association with fibrous or pulverulent fillers.

Other appropriate ingredients may be added to the compositions of this invention such as fillers, dyes, pigments, thermal and uv stabilizers, and the like depending on the end use.

It has also been found advantageous to optionally add to the compositions of this invention a curing catalyst. The curing catalyst aids in increasing the rate of cure of the compositions, thus, shortening the process time in preparing the fully cured resin. Examples of curing catalysts are the organic peroxide compounds such as di-t-butyl peroxide, dilauryl peroxide, dicumyl peroxide, tert-butyl peroxide, or tert-butyl peroxide benzoate. These curing catalysts are preferably used in a concentration range from 0.01% to 5%, and particularly, from 0.25% to 1%, based on a total weight of bis-imides and Schiff base.

To further illustrate the nature of this invention and the process employed in preparing the cured resin, the following examples are given below.

EXAMPLE 1

Typical of the methods used to prepare the Schiff bases are as follows:

A. Preparation of 4,4'-methylenebis{N-($\alpha$-methylbenzylidene)aniline}

A mixture of 4,4'-methylene dianiline (198 g; 1 mole), acetophenone (240 g; 2 moles) and a catalytic amount of stannous chloride was refluxed in toluene (3L) for 30 hours using a Dean-Stark trap. The theoretical amount of water was removed from the system. The toluene was then removed under vacuum.

The residual oil crystallized immediately upon cooling. The resulting solid was ground in hexane (1.5L) in a Waring Blender, suction filtered, air dried, and finally recrystallized from methyl cellosolve (1500 ml). The resulting yellow needles were dried for 24 hours in a vacuum oven at room temperature, and had a melting point of 116°–119°C.

B. Preparation of 4,4'-methylenebis(N-benzylidene aniline)

Benzaldehyde (212 g; 4 moles) was added in one portion to a solution of 4,4'-methylene dianiline (396 g; 2 moles) in ethanol (4L) at a temperature of 40°C. The product precipitated in white plates after 5 minutes of stirring. The product was suction filtered, washed with ethanol (2L) followed by water (2L) and dried in a vacuum oven at 60°C for 24 hours. The product had a melting point of 126°–130°C.

The following three bis-Schiff bases were prepared similarly to 4,4'-methylenebis(N-benzylidene aniline)
 a. N, N'-dibenzylidene-m-phenylenediamine m.p. 109°–110°C
 b. N,N'-dibenzylidene-p-phenylenediamine m.p. 139°C–140°C
 c. glyoxal bis-(4-methoxy-anil) m.p. 153°–157°C.

C. Preparation of N,N'-dibenzylidene ethylenediamine

A mixture of ethylene diamine (12.02 g; 0.2 mole) and benzaldehyde (42.44 g; 0.4 mole) in toluene (200 ml) was refluxed for 4 hours using a Dean-Stark trap. The toluene was then removed under vacuum. The residual oil crystallized on cooling. The resulting product was dried in a vacuum oven for 24 hours at room temperature and had a melting point of 52°–54°C.

EXAMPLE 2

Typical of the methods used to prepare the unsaturated N,N'-bis-imides are as follows:

A. Preparation of citraconic N,N'-diphenylmethane-bis-imide

A solution of 4,4'-methylene dianiline (396 g; 2 moles) in DMF (500 ml) was added dropwise to a refluxing solution of citraconic anhydride (448 g; 4 moles) in toluene (2L). A thick yellow amide-acid precipitate formed upon addition. The mixture was refluxed for 16 hours under a Dean-Stark trap. A homogeneous solution resulted. The toluene was removed under vacuum and the cooled viscous residue was coagulaged from water in a large Waring Blender.

The product was dried at 70°C in a vacuum oven for 48 hours. The product had a melting point of 90°–100°C.

B. Preparation of maleic N,N'-metaphenylene-bis-imide

To a 3 neck, 200 ml flask equipped with a stirrer and water bath was added 17.7 gm (0.16 mole) of m-phenylene diamine, 15 gm (0.18 mole) of anhydrous sodium acetate and 50 ml of DMF. The mixture was heated to 48°C. To the resulting slurry was added 32 gm (0.34 mole) of maleic anhydride, forming a clear yellow solution. After about 5 minutes, 42 gm (0.41 mole) of acetic anhydride was added. Stirring was continued for 3 hours at 45°C, after which time a heavy yellow slurry had formed. The mass was poured into a rapidly stirred ten fold excess of water. The bright yellow solid obtained was filtered off and vacuum dried and had a melting point of 197°–199°C.

In similar manner, by substituting for m-phenylene diamine an equivalent amount of the following amines a. 4,4'-diaminodiphenylether
b. 4,4'-diaminodiphenyl
c. 4,4'-diaminodiphenylsulfone
d. 4,4'-diaminodiphenylsulfide
e. ethylenediamine
f. 4,4'-diaminodiphenylmethane
g. 2,4-toluenediamine there is respectively obtained the following compounds:

a. maleic N,N'-4,4'-diphenylether-bis-imide
b. maleic N,N'-4,4'-diphenyl-bis-imide
c. maleic N,N'-4,4'-diphenylsulfone-bis-imide
d. maleic N,N'-4,4'-diphenylsulfide-bis-imide
e. maleic N,N'-ethylene-bis-imide
f. maleic N,N'-diphenylmethane-bis-imide m.p. 150°C–152°C
g. maleic N,N'-2,4-toluene-bis-imide m.p. 197°C–198°C In a similar manner by substituting for the m-phenylene diamine and maleic anhydride and equivalent amount of the following amines and unsaturated anhydrides a. 4,4'-diaminodiphenylether + dichloro maleic anhydride
b. 4,4'-diaminodiphenylether + dimethylmaleic anhydride c. 4,4'-diaminodiphenylether + itaconic anhydride there is respectively obtained the following compounds:

a. dichloromaleic N,N'-4,4'-diphenylether-bis-imide
b. dimethylmaleic N,N'-paraphenylether-bis-imide
c. itaconic N,N'-paraphenylether-bis-imide

EXAMPLE 3

A mixture of 4,4'-methylenebis[N-α-methylbenzylidene) aniline] maleic N,N'-diphenylmethane-bis-imide in the mole ratio of 1:3 was advanced for 7 hours in tetrahydrofuran at reflux temperatures. A lay-up of 12 piles of 181E A1100 cloth impregnated with this tetrahydrofuran varnish and (prepreg resin content 41%) was heated in a simulated autoclave to 260°F under vacuum over a 15 minute period. It was then "B" staged for 1 hour at 260°F with vacuum. A pressure of 90 psi was applied and the temperature was raised from 260°F to 350°F over a 30 minute period. The system was then cured for 1 hour at 350°F, 90 psi, under vacuum, and cooled under restraint. The laminate was postcured unrestrained from room temperature to 260°C (500°F) over a 6 hour period and at 260°C for 10 hours.

The resulting laminate had a resin content of 26.14%, a void content of 0.41%, and a specific gravity of 2.02 g/cc.

The following physical properties were observed:

|  | Before Post Cure PSI | After Post cure PSI | |
|---|---|---|---|
|  | Room Temperature | Room Temperature | 500°F |
| Flexural Strength | 55.2 × 10.3 | 68.9 × 10.3 | 47.9 × 10.3 |
| Flexural Modulus | 2.35 × 10.6 | 2.94 × 10.6 | 2.23 × 10.6 |
| Short Bean Shear | 3180 | 6703 | 4146 |

The Flexural Strength and Flexural Modulus was determined according to ASTM Standard D790 and the Short Bean Shear Strength was determined according to ASTM Standard D2344.

EXAMPLE 4

A neat mixture of maleic N,N'-diphenylmethane-bis-imide and N,N'-dibenzylidene-m-phenylenediamine in a mole ratio of 2 to 1 was preparaed. The mixture had a melting point of 90°C and had a gel time of 3 minutes at 200°C. The mixture was advanced for 60 minutes in an open tray in an oven at 110°C. The cooled advanced powder was blended with 50% Daper (powdered quartz) and molded for 1 hour in a 350°F compression mold at 3000 psi. The resulting placques were post cured for 2 hours from room temperature to 500°F and at 500°F for 22 hours. The Flexural Strength of the cured molded placques was determined at room temperature and 500°F according to ASTM Standard A-7800 and had a value of 7120 psi and 5270 psi, respectively. A portion of the initial mix when cured for 30 minutes at 350°C had a glass transition temperature greater than 350°C as determined by Torsional Braid analysis.

EXAMPLE 5

A neat mixture of maleic-N,N'-diphenylmethane-bis-imide and 4,4'-methylenebis(N-benzylidene aniline) in a mole ratio of 2 to 1 was prepared. The mixture had a melting point of 110°C and had a gel time of 8 minutes at 200°C. The mixture was advanced for 60 minutes in an open tray in an oven at 110°C. The cooled advance powder was blended with 50% Daper (powdered quartz) and molded for 1 hour in a 350°F compression mold at 3000 psi. The resulting placques were post cured for 2 hours from room temperature to 500°F and at 500°F for 22 hours. The Flexural Strength of the cured molded placques was determined at room temperature, and 400°F according to ASTM Standard A-7800 had a value of 4960 psi and 3880 psi, respectively. A portion of the initial mix when cured for 30 minutes at 350°C had a glass transition temperature of 340°C as determined by Torsional Braid analysis.

EXAMPLE 6

A neat mixture of maleic N,N'-metaphenylene-bis-imide and 4,4'-methylenebis(N-benzylidene aniline) in a mole ratio of 2 to 1 was prepared. The mixture had a melting point of 119°C and had a gel time of 11 minutes at 200°C. The mixture was advanced for 60 minutes in an open tray in an oven at 110°C. The cooled advance powder was blended with 50% Daper (powdered quartz) and molded for 1 hour in a 350°F compression mold at 3000 psi. The resulting placques were post cured for 2 hours from room temperature to 500°F and at 500°F for 22 hours. The Flexural Strength of the cured molded placques was determined at room temperature and 400°F according to ASTM Standard A-7800 and had a value of 2540 psi and 3920 psi, respectively. A portion of the initial mix when cured for 30 minutes at 350°C had a glass transition temperature of 325°C as determined by Torsional Braid analysis.

EXAMPLE 7

A heat mixture of maleic N,N'-metaphenylene-bis-imide and N,N'-dibenzylidene-m-phenylenediamine in a mole ratio of 2 to 1 was prepared. The mixture had a melting point of 100°C and had a gel time of 2 minutes at 200°C. The mixture was advanced for 60 minutes in an open tray at 110°C. The cooled advance powder was blended with 50% Daper (powdered quartz) and molded for 1 hour in a 350°F compression mold at 3000 psi. The resulting placques were post cured for 2 hours from room temperature to 500°F and at 500°F for 22 hours. The Flexural Strength of the cured mold placques was determined at room temperature and 500°F according to ASTM Standard A-7800 and had a value of 6800 psi and 4030 psi, respectively. A portion of the initial mix when cured for 30 minutes at 350°C had a glass transition temperature greater than 350°C as determined by Torsional Braid analysis.

EXAMPLE 8

A neat mixture of maleic N,N'-diphenylmethane-bis-imide and 4,4'-methylenebis[N-(α-methylbenzylidene)amine] in a mole ratio of 3 to 1 was prepared. The mixture had a melting point of 100°C and had a gel time of 2½ minutes at 150°C. The mixture was advanced for 60 minutes in an open tray in an oven at 110°C. The cooled advance powder was blended with 50% Daper (powdered quartz) and molded for 1 hour in a 350°F compression mold at 3000 psi. The resulting placques were post cured for 2 hours from room temperature at 500°F and at 500°F for 22 hours. The Flexural Strength of the cured mold placques was determined at room temperature according to ASTM Standard A-7800 and had a value of 10,800 psi. A portion of the initial mix when cured for 30 minutes at 350°C had a glass transition temperature greater than 350°C as determined by Torsional Braid analysis.

What is claimed is:

1. A stable heat curable composition consisting essentially of (a) an unsaturated N,N'-bis-imide having the formula

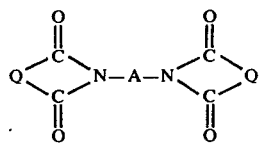

wherein

A is an alkylene group containing from 2 to 12 carbon atoms; cycloalkylene group containing from 4 to 6 carbon atoms, a xylylene group, an arylene group selected from phenylene, tolylene, biphenylene, naphthylene; a substituted arylene group of the formula

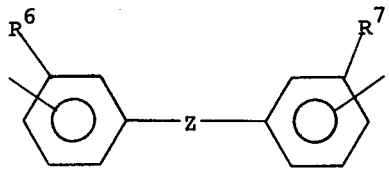

wherein Z is sulfur, carbonyl, —NH, N—(lower)alkyl, —O—, N-phenyl, sulfonyl, an alkylene group of from 1 to 3 carbon atoms, $R^6$ and $R^7$ are independent and each is hydrogen, chloro, or bromo, (lower)alkyl of from 1 to 5 carbon atoms, or (lower)alkoxy containing from 1 to 5 carbon atoms;

Q is a divalent radical containing olefinic unsaturation having the formula

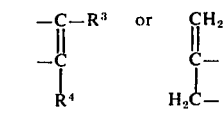

wherein $R^3$ is hydrogen, methyl, bromo or chloro;
$R^4$ is hydrogen, methyl, bromo or chloro;

From about 0.5 to 0.166 mole equivalents per mole equivalent of (a) of a Schiff base having the formula

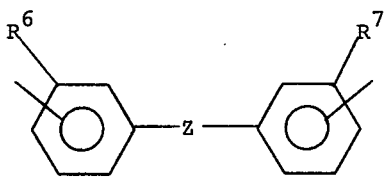

wherein $R^1$ and $R^2$ independently is hydrogen, an alkyl group containing from 1 to 12 carbon atoms, an aryl group containing from 6 to 12 carbon atoms, an alkaryl group containing from 7 to 15 carbon atoms, an aralkyl group containing from 7 to 15 carbon atoms, chlorophenyl, alkoxyphenyl, said alkoxy containing from 1 to 5 carbon atoms, or together with the carbon to which they are attached form a monocyclic ring containing 5 to 6 carbon atoms, with the proviso that only one of $R^1$ or $R^2$ may be hydrogen at the same time; and A is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula

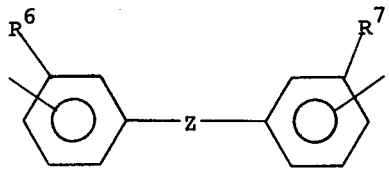

wherein Z is sulfur, carbonyl, —NH, —N(lower)alkyl, —O—, —N— phenyl, sulfonyl, an alkylene group of from 1 to 3 carbon atoms, $R^6$ and $R^7$ are independent and each is hydrogen, chloro, or bromo, (lower)alkyl of from 1 to 5 carbon atoms, (lower) alkoxy containing from 1 to 5 carbon atoms, or a group having the formula

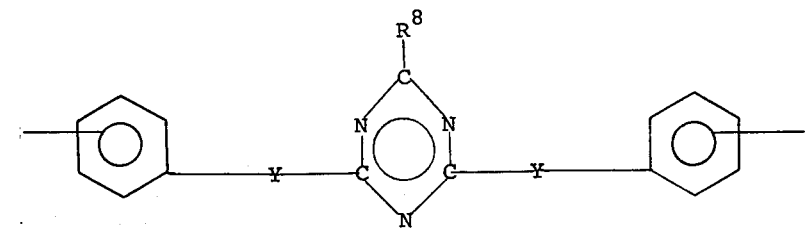

wherein Y is a covalent bond or —NH, and R⁸ is phenyl piperidino, hydrogen, diphenylamino or di(lower)alkyl amino.

2. A composition according to claim 1 which further contains a peroxide curing catalyst.

3. A composition according to claim 1 wherein
a. is an unsaturated N,N'-bis-imide having the formula

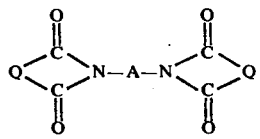

wherein A is m or p-phenylene, biphenylene or alkylene group containing from 2 to 12 carbon atoms or a group having the formula

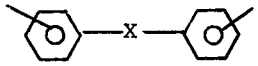

wherein X is —O—, sulfonyl, or alkylene group containing from 1 to 3 carbon atoms; and Q is a divalent radical containing olefinic unsaturation have the formula

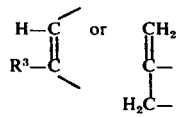

wherein
R³ is hydrogen or methyl;
b. is a Schiff base having the formula

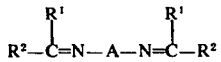

wherein
R¹ and R² independently is hydrogen, an alkyl group containing from 1 to 12 carbon atoms, phenyl group, tolyl, chlorophenyl, or alkoxyphenyl, said alkoxy containing from 1 to 5 carbon atoms, with the proviso that only one of R¹ and R² may be hydrogen at the same time;

A is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula

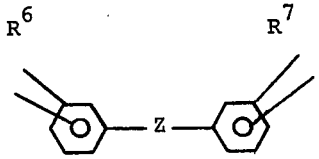

wherein Z is sulfur, carbonyl, —NH, N—(lower)alkyl, —O—, —N-phenyl, sulfonyl, an alkylene group of from 1 to 3 carbon atoms, R⁶ and R⁷ are independent and each is hydrogen, chloro, or bromo, (lower)alkyl of from 1 to 5 carbon atoms, (lower)alkoxy containing from 1 to 5 carbon atoms, or a group having the formula

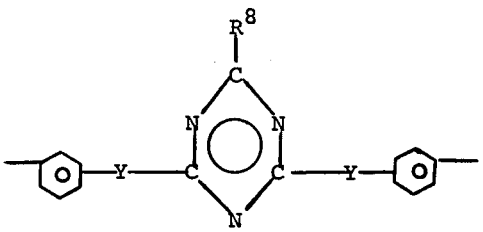

where Y is a covalent bond or —NH, and R⁸ is phenyl, piperidino, hydrogen, diphenylamino or di(lower)alkyl amino.

4. A composition according to claim 1 wherein the unsaturated N,N'-bis-imide is maleic N,N'-diphenylmethane-bis-imide, and the Schiff Base is 4,4'-methylenebis[N-(α-methylbenzylidene)aniline].

5. A composition according to claim 1 wherein the unsaturated N,N'-bis-imide is maleic N,N'-diphenylmethane-bis-imide and the Schiff Base is N,N'-dibenzylidene-metaphenylenediamine.

6. A composition according to claim 1 wherein the unsaturated N,N'-bis-imide is maleic N,N'-diphenylmethane-bis-imide and the Schiff Base is 4,4'-methylenebis(N-benzylideneaniline).

7. A composition according to claim 1 wherein the unsaturated N,N'-bis-imide is maleic N,N'-metaphenylene-bis-imide and the Schiff Base is 4,4'-methylenebis(N-benzylideneaniline).

8. A composition according to claim 1 wherein the unsaturated N,N'-bis-imide is maleic N,N'-metaphenylene-bis-imide and the Schiff Base is N,N'-dibenzylidene-m-phenylenediamine.

9. A composition according to claim 1 wherein the unsaturated N,N'-bis-imide maleic N,N'-diphenylmethane-bis-imide and the Schiff Base 4,4'-methylenebis]N-(α-methylbenzylidene)aniline].

10. A solution of a composition according to claim 1 in a volatile inert solvent for said composition.

11. A molding powder consisting essentially of the composition according to claim 1.

12. The crosslinked, infusible and insoluble resin consisting essentially of the product obtained by heating at 100°C to 350°C the composition of claim 1.

* * * * *